(12) United States Patent
Modai et al.

(10) Patent No.: US 8,837,330 B1
(45) Date of Patent: Sep. 16, 2014

(54) METHODS, SYSTEMS, AND MEDIA FOR COMBINING CONFERENCING SIGNALS

(75) Inventors: Ori Modai, Ramat Hasharon (IL); Shimon Nurick, Tel Aviv (IL)

(73) Assignee: AVAYA Inc., Basking Ridge, NJ (US)

( * ) Notice: Subject to any disclaimer, the term of this patent is extended or adjusted under 35 U.S.C. 154(b) by 1608 days.

(21) Appl. No.: 11/545,340

(22) Filed: Oct. 10, 2006

(51) Int. Cl.
*H04L 12/16* (2006.01)

(52) U.S. Cl.
USPC .......................................... 370/260; 709/204

(58) Field of Classification Search
USPC .................. 370/260–270; 348/14.1–14.16
See application file for complete search history.

(56) References Cited

U.S. PATENT DOCUMENTS

| | | | |
|---|---|---|---|
| 5,734,724 A * | 3/1998 | Kinoshita et al. | 381/17 |
| 6,501,739 B1 * | 12/2002 | Cohen | 370/260 |
| 6,621,514 B1 * | 9/2003 | Hamilton | 348/14.09 |
| 7,313,593 B1 * | 12/2007 | Pulito et al. | 709/204 |
| 7,420,935 B2 * | 9/2008 | Virolainen | 370/263 |
| 7,460,495 B2 * | 12/2008 | Li | 370/267 |
| 8,059,730 B2 * | 11/2011 | Huang et al. | 375/260 |
| 2003/0063574 A1 * | 4/2003 | Virolainen | 370/260 |
| 2006/0146734 A1 * | 7/2006 | Wenger et al. | 370/260 |
| 2007/0177529 A1 * | 8/2007 | Provino et al. | 370/260 |

* cited by examiner

*Primary Examiner* — Maria El-Zoobi

(57) ABSTRACT

Methods, systems, and media for combining conferencing signals are provided. In some embodiments, methods for combining conferencing signals are provided, wherein the methods include: selecting first selected signals from a plurality of first input signals; combining the first selected signals to provide first combined signals; sending the first combined signals to at least one of an audio mixer and a video composer; receiving second combined signals from the at least one of an audio mixer and a video composer; separating a second input signal from the second combined signals; selecting second selected signals from the plurality of first input signals and the second input signal; combining the second selected signals to provide an output signal; and outputting the output signal.

33 Claims, 4 Drawing Sheets

METHODS, SYSTEMS, AND MEDIA FOR COMBINING CONFERENCING SIGNALS

TECHNOLOGY AREA

The present invention relates to methods, systems, and media for combining conferencing signals.

BACKGROUND

Since the invention of the telephone, it has been possible for individuals to verbally communicate with each other without being physically located in the same place. More recently, voice and video conferencing systems have allowed groups of individuals to interact with each other as if they were sitting around the same table even though they may be half way around the world.

In order to enable multiple audio sources, such as multiple people speaking, to be heard at the same time, such conferencing systems frequently contain mixers to mix the audio signals. These mixers typically receive several input signals, select a subset of those signals as being active, e.g., based on amplitude, and then mix the active signals together.

Mixers are typically limited in how many input signals they can receive, however. In order to overcome this problem, prior systems have cascaded mixers so that an output of one mixer is feeding the input of another. In this way, a single input of a mixer can be used to receive multiple input signals that have already been mixed together from another mixer.

Similarly, video composers have combined video signals in an analogous fashion.

FIG. 1 is an illustration of such an arrangement of mixers. As shown, the arrangement may include three mixers 10, 20, and 30. Each of these mixers may include an input section 14, 24, and 34 and a mixing section 15, 25, and 35. One mixer, here mixer 10, is the master mixer and the other mixers, here mixers 20 and 30, are the slave mixers with their outputs connected to inputs of mixer 10. As also shown in FIG. 1, three participants 11, 12, and 13 are illustrated as being connected to mixer 10, three participants 21, 22, and 23 are illustrated as being connected to mixer 20, and three participants 31, 32, and 33 are illustrated as being connected to mixer 30.

As shown, each of the participants 11, 12, 13, 21, 22, 23, 31, 32, and 33 receives an output signal from a mixing section of one of mixers 10, 20, and 30. These output signals are a combination of the signals from the local mixer (e.g., mixer 10 for participants 11, 12, and 13) as well as remote mixers (e.g., mixers 20 and 30 for participants 11, 12, and 13).

In order to provide this combination of signals, the input sections of mixers 10, 20, and 30 first select a subset of their inputs for mixing. For example, the input section of mixer 10 will compare the signals from participants 11, 12, and 13 and the outputs of mixers 20 and 30 to identify a subset of signals to be mixed. This signals could be four signals from participants 11 and 12 and mixers 20 and 30, as a more particular example. The mixing sections of the mixers then combine the selected signals and produce an output to be provided to the local participants and other mixers.

Because at least one output of each mixer 10, 20, and 30 is connected to an input of another mixer, the input from each participant can propagate to all participants through the other mixers. For example, assume participant 31 is speaking loudly enough to be selected by input section 34 of mixer 30. The signal from that participant would be selected and mixed with some other set of signals (e.g., one or more of participants 32 and 33 and/or the output signal from mixer 10) and output to participants 31, 32, and 33 and mixer 10. Mixer 10 would then select and mix signals from participants 11, 12, and 13 and mixers 20 and 30. Again, assuming that the signal from participant 31 is suitably loud, the signal from participant 31 would then be included in the output of mixer 10. Mixer 20 would then receive the output signal of mixer 10, compare it to the signals from participants 21, 22, and 23, select some set of these signals, mix the set of signals, and then output the mixed signal to participants 21, 22, and 23 and mixer 10. Thus, the signal from participant 31 would propagate through mixer 30 to mixer 10 and then to mixer 20, and then to participant 21 (for example).

This approach to mixing signals is problematic, however, in that it increases delay, accumulates signal quality degradation, and limits audio mixing capabilities. For example, because an input signal originating at a slave mixer needs to travel through that slave mixer and the master mixer in order to arrive at another slave mixer, there is increased delay over a configuration in which the two slave mixers were connected directly, for example. Similarly, as another example, this routing of the input signal also accumulates signal quality degradation because each mixer introduces its own signal degradation. And, because each mixer selects and produces a mixed signal that cannot be separated based upon its own inputs, audio mixing capabilities by the other mixers are limited to what signals are chosen to generate the mixed signal.

Likewise, combining of video signals in a similar fashion is also problematic.

Accordingly, improved methods, systems, and media for mixing conferencing signals are desired.

SUMMARY

Methods, systems, and media for combining conferencing signals are provided. In some embodiments, methods for mixing conferencing signals are provided, wherein the methods include: selecting first selected signals from a plurality of first input signals; combining the first selected signals to provide first combined signals; sending the first combined signals to at least one of an audio mixer and a video composer; receiving second combined signals from the at least one of an audio mixer and a video composer; separating a second input signal from the second combined signals; selecting second selected signals from the plurality of first input signals and the second input signal; combining the second selected signals to provide an output signal; and outputting the output signal.

In some embodiments, systems for combining conferencing signals are provided, wherein the systems include: a plurality of local participants that produce a plurality of first input signals; at least one of a first mixer and a first video composer that receives first combined signals and transmits second combined signals; and at least one of a second mixer and a second video composer coupled to the plurality of local participants that: receives the plurality of first input signals, selects first selected signals from the plurality of first input signals, combines the first selected signals to provide first combined signals, transmits the first combined signals to the at least one of a first mixer and a first video composer, receives the second combined signals from the at least one of a first mixer and a first video composer, separates a second input signal from the second combined signals, selects second selected signals from the plurality of first input signals and the second input signal, combines the second selected signals to provide an output signal, and outputs the output signal to the plurality of local participants.

In some embodiments, computer-readable media containing computer-executable instructions that, when executed by a computer, cause the computer to perform a method for combining conference signals, are provided, the method including: selecting first selected signals from a plurality of first input signals; selecting first selected signals from a plurality of first input signals; combining the first selected signals to provide first combined signals; sending the first combined signals to at least one of an audio mixer and a video composer; receiving second combined signals from the at least one of an audio mixer and a video composer; separating a second input signal from the second combined signals; selecting second selected signals from the plurality of first input signals and the second input signal; combining the second selected signals to provide an output signal; and outputting the output signal.

DETAILED DESCRIPTION

Figure 1:
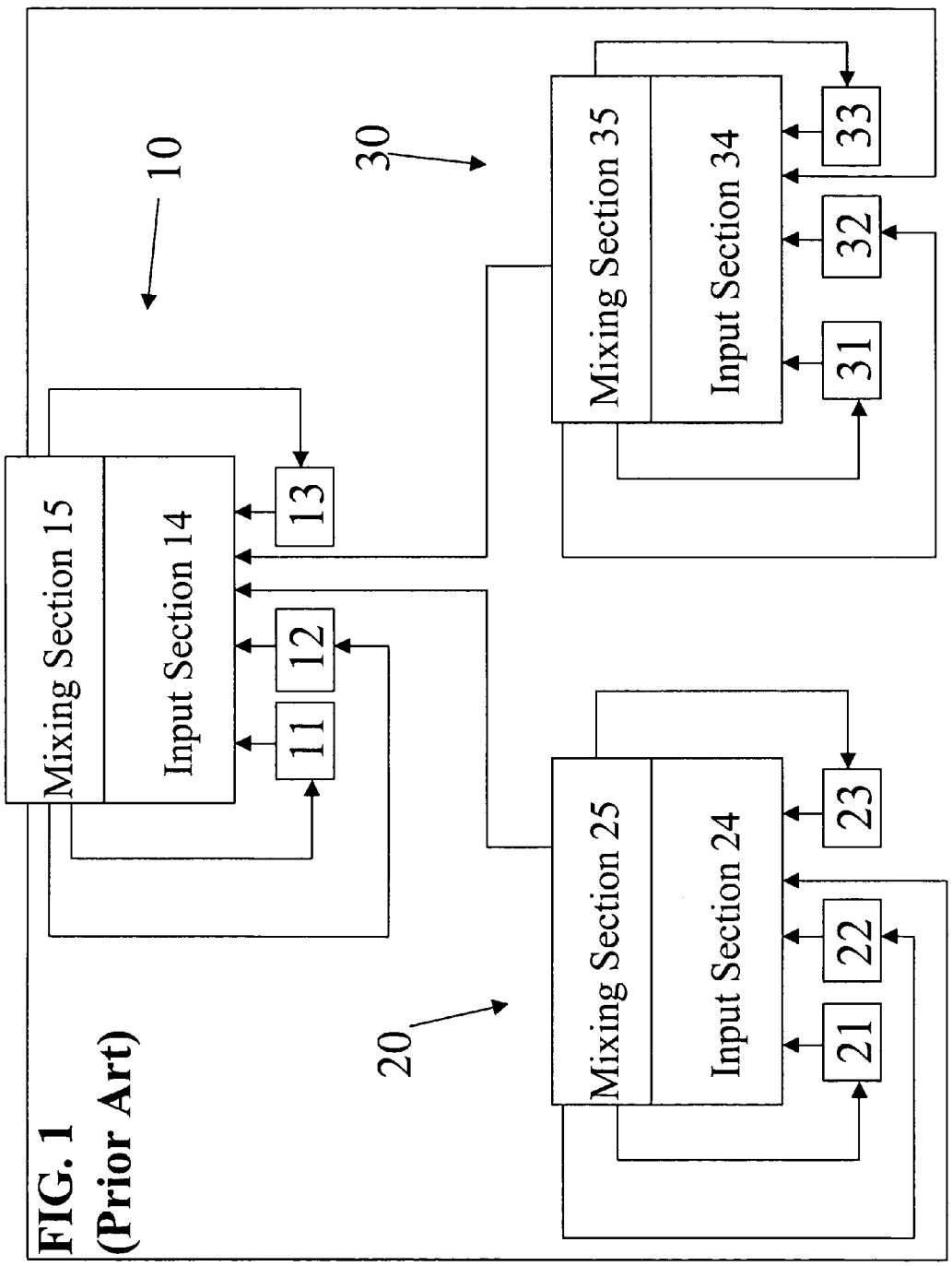
FIG. 1 is a block diagram of a prior art system for mixing conferencing signals in which the mixers are in a cascaded arrangement.
Figure 2:
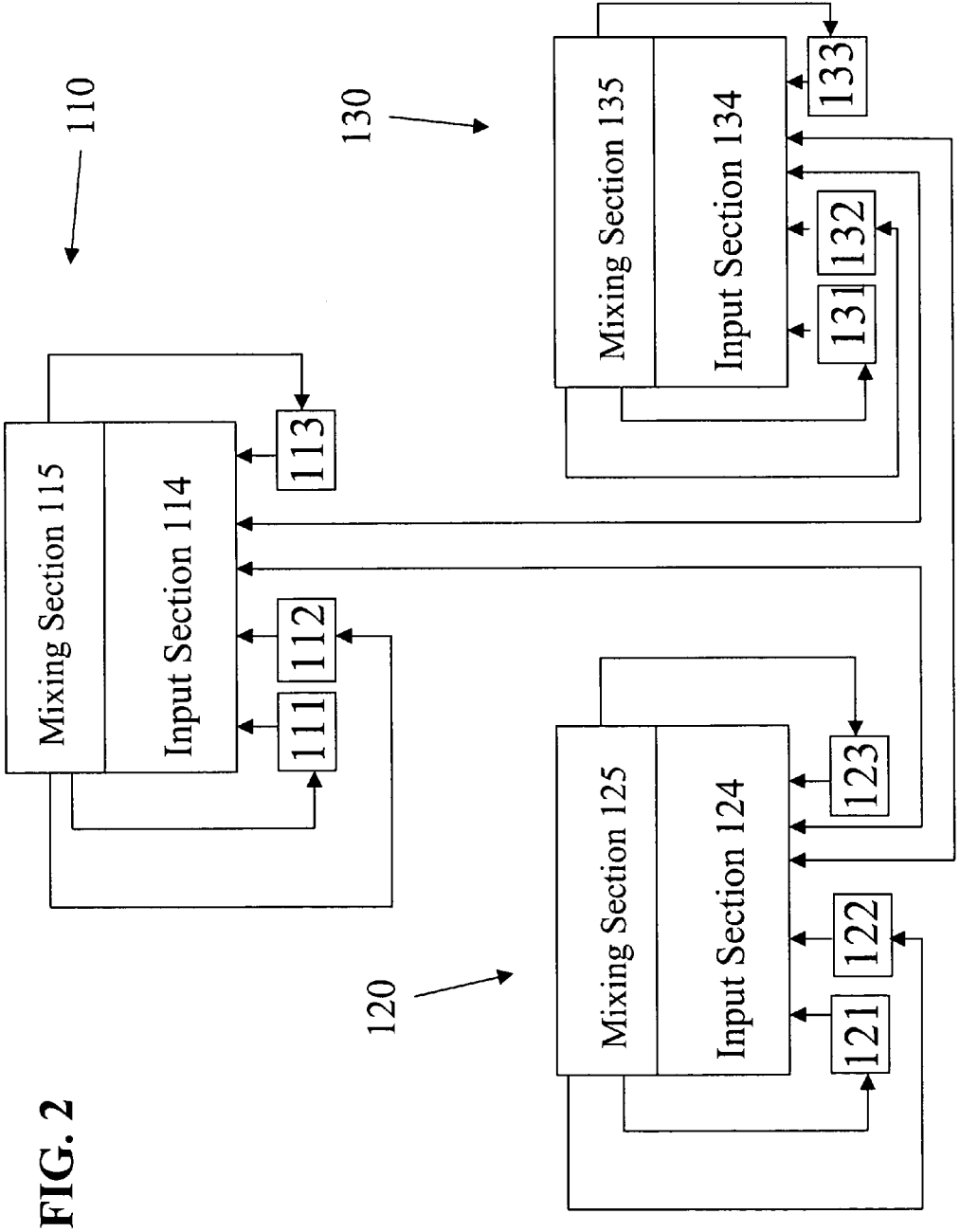
FIG. 2 is a block diagram of a system for mixing conferencing signals in accordance with certain embodiments of the present invention.

In accordance with certain embodiments of the present invention, methods, systems, and media for mixing conferencing signals are provided. For example, as shown in FIG. 2, a configuration of mixers 110, 120, and 130 that may be used in methods, systems, and media of in accordance with certain embodiment is provided. As shown, each of mixers 110, 120, and 130 is coupled to corresponding ones of participants 111, 112, 113, 121, 122, 123, 131, 132, and 133. These participants may be any suitable devices for engaging in a conference including, but limited to, video conferencing units, telephones, cellular phones, computers, and personal digital assistants. Although the outputs from the participants are shown as being coupled to the inputs to the mixers via a separate path from the path used to couple the outputs from the mixers to the inputs to the participants, the same path, or more than two paths, for each combination of mixer and participant can additionally or alternatively be used. Moreover, paths between mixers and different participants can be combined. These paths may be any suitable mechanism for coupling the participants and the mixers, including, but not limited to, dedicated connections, wired computer networks, wireless computer networks, telephone networks, the Internet, etc.

As also shown, mixers 110, 120, and 130 may be coupled together. For example, as illustrated each mixer may be coupled to each other mixer. The paths used to couple the mixers may be bidirectional, as shown, or may be unidirectional in various embodiments. These paths may be any suitable mechanism for coupling the mixers, including, but not limited to, dedicated connections, wired computer networks, wireless computer networks, telephone networks, the Internet, etc.

Although there are three mixers 110, 120, and 130, each with three participants 111, 112, 113, 121, 122, 123, 131, 132, and 133, and each being coupled to the other mixers, it should be apparent that any suitable numbers of mixers, with any suitable numbers of participants, coupled in any suitable manner, may be used in accordance with various embodiments. Any of the mixers and participants may be separate devices, may be combined together, or may be incorporated into other devices in accordance with various embodiments. For example, the mixers may be present in audio bridges, multi-conferencing units, etc.

Figure 3:
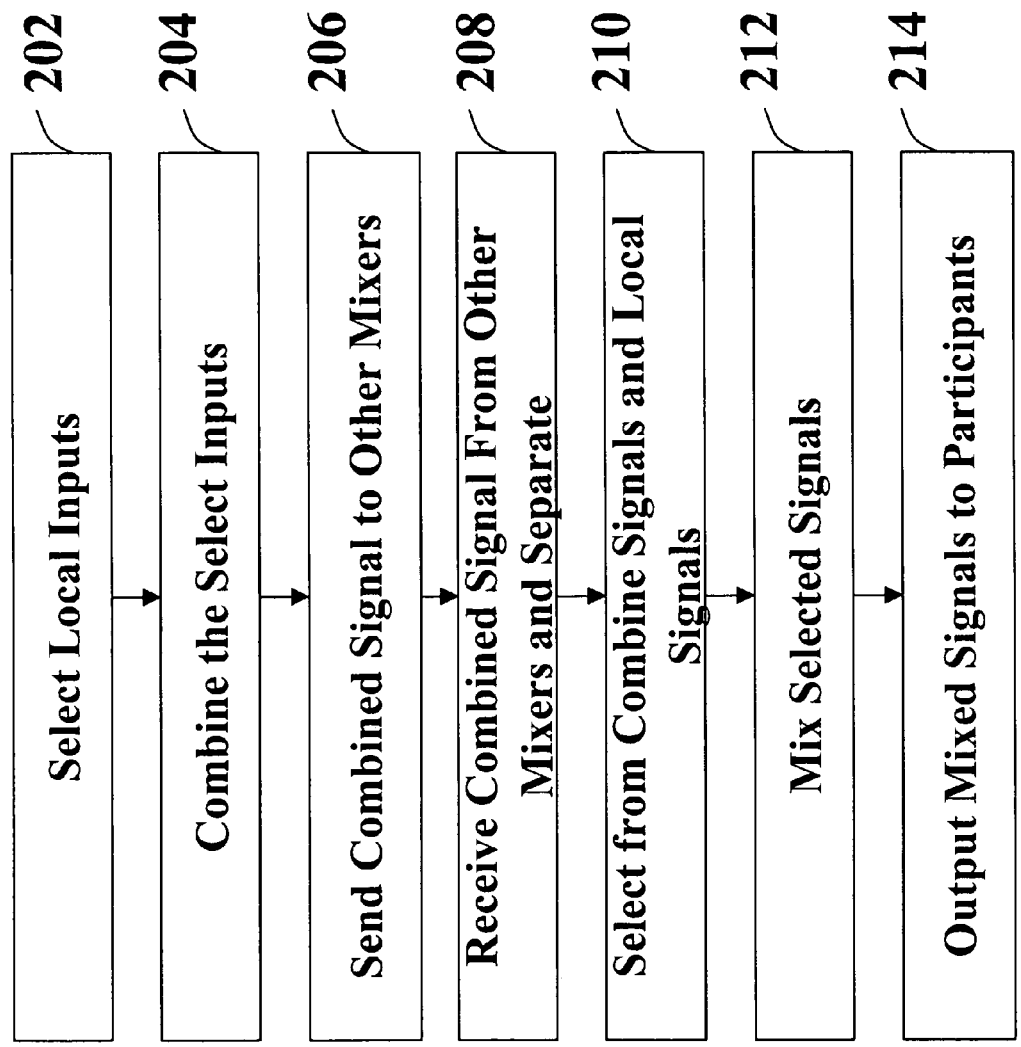
FIG. 3 is a diagram illustrating a method for mixing conferencing signals in accordance with certain embodiments of the present invention.

Referring to FIG. 3, a diagram of a method for mixing signals that may be used in mixers 110, 120, and 130 in accordance with various embodiments of the present invention is shown. Although FIG. 3 is described herein in connection with mixer 110, it should be apparent that the method of FIG. 3 could be used with mixers 120 and/or 130 as well.

As illustrated, at 202, the input section 114 of mixer 110 may select local inputs for further processing. These local inputs may include inputs from participants 111, 112, 113, and/or any other participants coupled to mixer 110. These inputs may be selected based upon any suitable criteria or criterion, including, but not limited to, which input is currently active, which input is most energetic, the absolute volume of the input signal, a relative volume of the input signal, a predetermined selection, a randomly made selection, etc. The number of inputs selected may be fixed or variable. For example, if volume is used as a criterion, in a fixed approach, the inputs with the four (or any other number) highest volume levels may be selected. In a variable approach, any inputs over a volume level may be selected. Thus, any suitable number of inputs may be selectable, from zero to all inputs, in accordance with various embodiments.

At 204, input section 114 may combine the selected input signals together. The combining may produce one or more packets. The combining may occur in any suitable manner in which the input signals can be separated out after being combined, for example by using multiplexing. A header may be included within the combined output that contains a table of contents. An entry in the table of contents may refer to an input in the combined output and contain a unique identifier for the input and an indicator based on the criteria or criterion used to select the input (e.g., the input's volume level).

At 206, the combined output may be sent from mixer 110 to mixers 120 and 130 (and/or any other mixers). The output may be sent using any suitable technique. For example, the output may be sent to specific mixers, may be broadcast to a set of mixers, may be multicast to specific mixers, etc.

At 208, the input section 114 of the mixer may receive combined outputs from other mixers and separate-out the input signals from the combined outputs. The separating may occur in any suitable manner in which the inputs signals can be separated out from the combined signal, for example by de-multiplexing. The separating may be done for every signal in the combined output or may be done for only certain signals. For example, by inspecting the table of contents of a combined output, a mixer may determine that none, only certain, or all of the input signals need to be separated.

At 210, the mixing section 115 of the mixer may select signals to be mixed and sent to the local participants (e.g., 111, 112, and/or 113) from the separated-out signals and local input signals. These signals may be selected based upon any suitable criteria or criterion, including, but not limited to, which signal is currently active, which signal is most energetic, the absolute volume of the signal, a relative volume of the signal, a predetermined selection, a randomly made selection, etc. The number of signals selected may be fixed or variable. For example, if volume is used as a criterion, in a fixed approach, the signals with the four (or any other number) highest volume levels may be selected. In a variable approach, any signals over a volume level may be selected. Thus, any suitable number of signals may be selectable, from zero to all signals, in accordance with various embodiments.

At 212, the signals selected at 210 may be mixed using any suitable technique. For example, the signals may be mixed by summing the signals together and normalizing the level of the resultant mixed signal to an audible output level.

At 214, the mixed signal from 212 may then be provided to the local participants. In order to reduce echo, each local participant's input signal (after suitable delay) may be subtracted from the mixed signal.

In some embodiments, 204 may be omitted and the inputs not combined, in which case rather than sending a combined output at 206, the inputs may be sent individually. Whether to omit 204 may be determined on a mixer-by-mixer basis.

Figure 4:
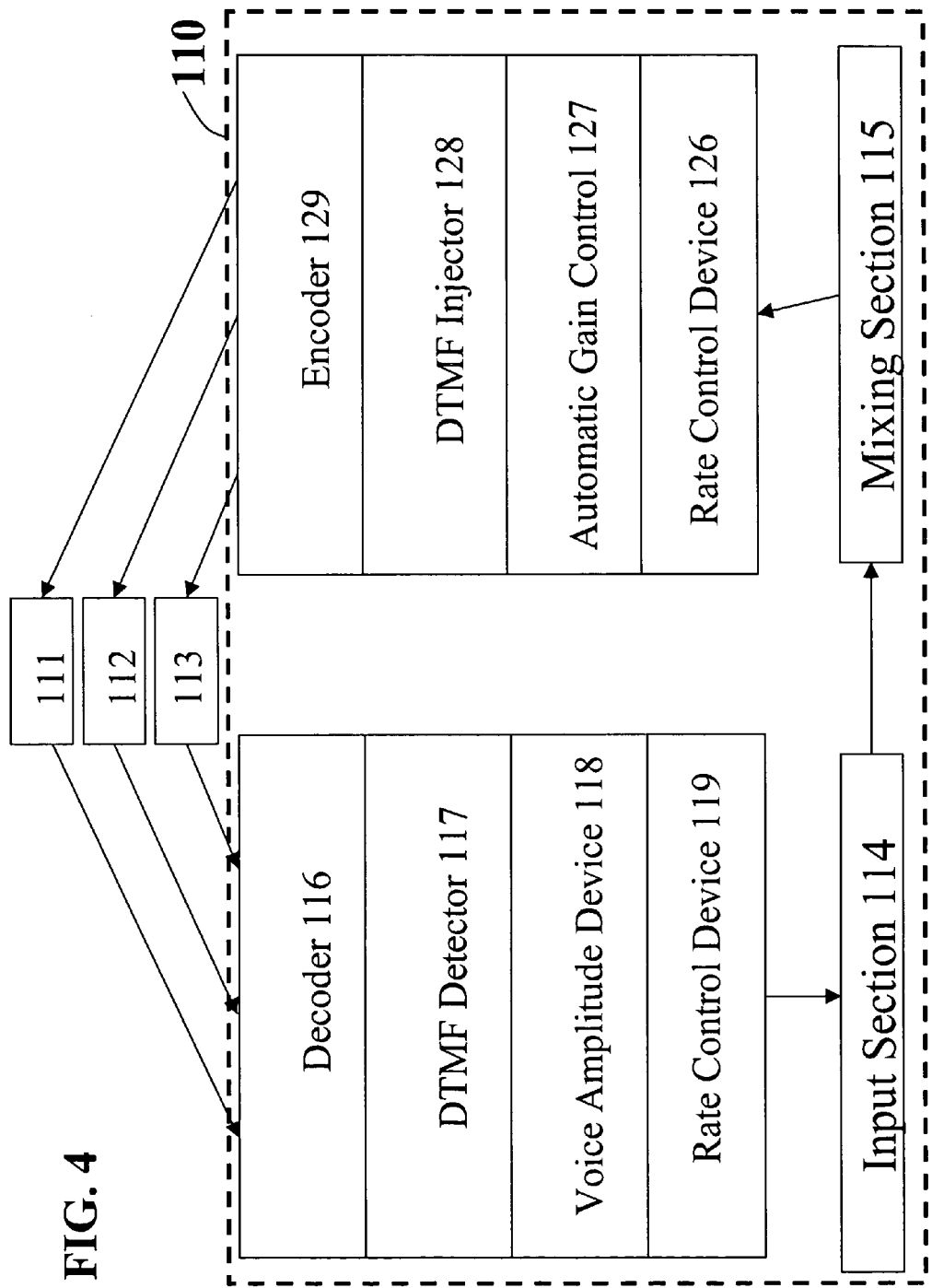
FIG. 4 is a block diagram showing more detail of a mixer in accordance with certain embodiments of the present invention.

Turning to FIG. 4, further details of mixer 110 in accordance with certain embodiments are illustrated. As shown, in addition to input section 114 and mixer section 115, mixer 110 may include a decoder 116, a DTMF detector 117, a voice amplitude device 118, a rate control device 119, a rate control device 126, an automatic gain control 127, a DTMF injector 128, and an encoder 129.

Decoder 116 may be used decode compressed audio signals into linear streams. The DTMF detector 117 may be used to analyze the streams, detect DTMF signals, and perform DTMF suppression. Voice amplitude device 118 may be used to weight the streams' energies to detect voice activity and perform automatic gain control to ensure smooth audio energy levels in the input. Rate control device 119 may be used to change the sampling rate of the incoming streams, if necessary, by performing up or down sampling. Similarly, rate control device 126 may be used to change the sampling rate of output streams, if necessary, by performing up or down sampling. Automatic gain control 127 may be used to ensure smooth audio level energies in the output. DTMF injector 128 may be used to inject DTMF signals into the output. And encoder 129 may be used to encode the output linear streams into compressed audio signals.

Although FIG. 4 is shown and described as corresponding to mixer 110, it should be apparent that FIG. 4 could equally apply to mixers 120 and 130, or any other mixers, in accordance with various embodiments.

Methods, systems, and media in accordance with various embodiments may be applied to teleconferencing, video conferencing, Voice Over IP conferencing, Voice Plus Video Over IP conferencing, and any other variations of conferencing.

Although the present invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow. For example, although the present invention is illustrated herein as being implemented with audio mixers, the present invention may additionally or alternatively be implemented with video composers (for combining video signals) or any other suitable signal combining mechanisms.

What is claimed is:

1. A method for combining conferencing signals, comprising:
   selecting, at a first mixer, first selected signals from a plurality of first input signals;
   sending first combined signals from the first mixer to at least one of an audio mixer and a video composer associated with a second mixer;
   receiving, at the first mixer, second combined signals from the at least one of an audio mixer and a video composer associated with the second mixer;
   separating, at the first mixer, a second input signal from the second combined signals;
   selecting, at the first mixer, second selected signals from the plurality of first combined signals and the second input signal;
   combining, at the first mixer, the second selected signals to provide an output signal; and
   outputting the output signal.

2. The method of claim 1, wherein the selecting the first selected signals comprises at least one of determining which of the plurality of first input signals is currently active, determining which of the plurality of first input signals is most energetic, and determining the volumes of the plurality of first input signals.

3. The method of claim 1, wherein the combining the first selected signals comprises multiplexing the first selected signals.

4. The method of claim 1, wherein the combining the first selected signals comprises including in the first combined signals at least one of a unique identifier and an indicator based on a criterion used to select at least one of the first selected signals.

5. The system of claim 1, wherein the sending the first combined signals comprises multicasting the first combined signals.

6. The method of claim 1, wherein the separating the second input signal comprises de-multiplexing the second input signal from the second combined signals.

7. The method of claim 1, wherein selecting the second selected signals comprises at least one of determining which of the plurality of first input signals and the second input signal is currently active, determining which of the plurality of first input signals is most energetic, and determining the volumes of the plurality of first input signals.

8. The method of claim 1, wherein the combining the second selected signals comprises summing the second selected signals.

9. The method of claim 1, further comprising subtracting one of the plurality of first input signals from the output signal to prevent echo.

10. The method of claim 1, wherein the plurality of first input signals are local input signals and the second input signal is a remote input signal.

11. The method of claim 1, further comprising receiving third combined signals from at least one of a second audio mixer and a second video composer and separating a third input signal from the third combined signals, wherein selecting the second selected signals comprises selecting the second selected signals from the plurality of first input signals, the second input signal and the third input signal.

12. A system for combining conferencing signals, comprising:
   a plurality of local participants that produce a plurality of first input signals;
   at least one of a first mixer and a first video composer that receives first combined signals and transmits second combined signals; and
   at least one of a second mixer and a second video composer coupled to the plurality of local participants that:
      receives the plurality of first input signals,
      selects first selected signals from the plurality of first input signals,
      combines the first selected signals to provide first combined signals, transmits the first combined signals to the at least one of a first mixer and a first video composer,
receives the second combined signals from the at least one of a first mixer and a first video composer,
separates a second input signal from the second combined signals,
selects second selected signals from the plurality of first input signals and the second input signal,
combines the second selected signals to provide an output signal, and
outputs the output signal to the plurality of local participants.

13. The system of claim 12, wherein the least one of a second mixer and a second video composer selects the first selected signals based on at least one of determining which of the plurality of first input signals is currently active, determining which of the plurality of first input signals is most energetic, and determining the volumes of the plurality of first input signals.

14. The system of claim 12, wherein the least one of a second mixer and a second video composer combines the first selected signals by multiplexing the first selected signals.

15. The system of claim 12, wherein the least one of a second mixer and a second video composer combines the first selected signals by multiplexing the first selected signals.

16. The system of claim 12, wherein the least one of a second mixer and a second video composer multicasts the first combined signals.

17. The system of claim 12, wherein the least one of a second mixer and a second video composer de-multiplexes the second input signal from the second combined signals.

18. The system of claim 12, wherein the at least one of a second mixer and a second video composer selects the second selected signals based on at least one of determining which of the plurality of first input signals and the second input signal is currently active, determining which of the plurality of first input signals is most energetic, and determining the volumes of the plurality of first input signals.

19. The system of claim 12, wherein the least one of a second mixer and a second video composer sums the second selected signals.

20. The system of claim 12, wherein the least one of a second mixer and a second video composer also subtracts one of the plurality of first input signals from the output signal to prevent echo.

21. The system of claim 12, wherein the plurality of first input signals are local input signals and the second input signal is a remote input signal.

22. The system of claim 12, further comprising at least one of a third audio mixer and a third video composer from which third combined signals are received, wherein the at least one of a second mixer and a second video composer separates a third input signal from the third combined signals and selects the second selected signals from the plurality of first input signals, the second input signal and the third input signal.

23. A non-transitory computer-readable medium containing computer-executable instructions that, when executed by a computer, cause the computer to perform a method for combining conference signals, the method comprising:
selecting, at a first mixer, first selected signals from a plurality of first input signals;
combining, at the first mixer, the first selected signals to provide first combined signals;
sending the first combined signals from the first mixer to at least one of an audio mixer and a video composer associated with a second mixer;
receiving second combined signals from the at least one of an audio mixer and a video composer associated with the second mixer;
separating, at the first mixer, a second input signal from the second combined signals; selecting, at the first mixer, second selected signals from the plurality of first input signals and the second input signal;
combining, at the first mixer, the second selected signals to provide an output signal; and
outputting the output signal.

24. The computer-readable medium of claim 23, wherein the selecting the first selected signals comprises at least one of determining which of the plurality of first input signals is currently active, determining which of the plurality of first input signals is most energetic, and determining the volumes of the plurality of first input signals.

25. The computer-readable medium of claim 23, wherein the combining the first selected signals comprises multiplexing the first selected signals.

26. The computer-readable medium of claim 23, wherein the combining the first selected signals comprises including in the first combined signals at least one of a unique identifier and an indicator based on a criterion used to select at least one of the first selected signals.

27. The computer-readable medium of claim 23, wherein the sending the first combined signals comprises multicasting the first combined signals.

28. The computer-readable medium of claim 23, wherein the separating the second input signal comprises de-multiplexing the second input signal from the second combined signals.

29. The computer-readable medium of claim 23, wherein selecting the second selected signals comprises at least one of determining which of the plurality of first input signals and the second input signal is currently active, determining which of the plurality of first input signals is most energetic, and determining the volumes of the plurality of first input signals.

30. The computer-readable medium of claim 23, wherein the combining the second selected signals comprises summing the second selected signals.

31. The computer-readable medium of claim 23, wherein the method further comprises subtracting one of the plurality of first input signals from the output signal to prevent echo.

32. The computer-readable medium of claim 23, wherein the plurality of first input signals are local input signals and the second input signal is a remote input signal.

33. The computer-readable medium of claim 23, wherein the method further comprises receiving third combined signals from at least one of a second audio mixer and a second video composer and separating a third input signal from the third combined signals, wherein selecting the second selected signals comprises selecting the second selected signals from the plurality of first input signals, the second input signal and the third input signal.

* * * * *